United States Patent Office 3,393,234
Patented July 16, 1968

3,393,234
PURIFICATION OF AN ALKALI METAL SALT OF NITRILOTRIACETIC ACID
John C. Wollensak, Royal Oak, Mich., assignor to Ethyl Corporation, New York, N.Y., a corporation of Virginia
No Drawing. Filed Nov. 1, 1965, Ser. No. 506,002
6 Claims. (Cl. 260—534)

ABSTRACT OF THE DISCLOSURE

Use of halogen for reduction of cyanide impurities in cyanide contaminated preparations of alkali metal salts of nitrilotriacetic acid.

---

This application is a continuation-in-part of application Ser. No. 427,947, filed Jan. 25, 1965, now U.S.P. 3,337,607.

This invention pertains to the removal of cyanide impurities from an alkali metal salt of nitrilotriacetic acid.

Alkali metal salts of nitrilotriacetic acid are useful in detergent formulations. Since detergent formulations containing them are useful in the household, it is especially desirable that the alkali metal salts be as free as possible from materials which are deleterious to health, e.g., cyanide. Many processes for the preparation of salts of nitrilotriacetic acid can produce these materials with cyanide impurity levels which are below that required to maintain human health during normal use. A method of this type is disclosed in application Ser. No. 427,947, filed in my name on Jan. 25, 1965, now U.S.P. 3,337,607. However, it is desirable, in the interest of safety, that even these safe materials be treated to further reduce the level of cyanide impurity.

This invention satisfies its object, namely, the provision of a method which will reduce cyanide levels in contaminated preparations of alkali metal salts of nitrilotriacetic acid. The method of this invention is readily carried out. More importantly, it does not have a gross adverse effect on the nitrilotriacetic acid salts themselves. In fact, the process of this invention has a very important desirable feature besides the reduction of cyanide levels. Specifically, the method of this invention aids in the decoloration of nitrilotriacetic acid salt preparations, thereby making them more acceptable in the market place.

In the main, the method of this invention comprises a process for reducing cyanide impurities in a cyanide contaminated alkali metal salt of nitrilotriacetic acid, said process comprising reacting said salt with a halogen having an atomic number of at least 17. Preferably, the halogen employed in this process is chlorine or bromine. Most preferably it is chlorine. However, any source of active halogen, e.g., an alkali metal hypohalite solution, can be used.

The efficiency of the process is somewhat dependent upon reaction temperature. In general (as discussed below) efficiency is favored by mild temperatures. Usually reaction temperatures less than about 100° C. are suitable. A preferred temperature range is from about —10° to about 60° C. while a most preferred range is from about —5° to 30° C.

Use of an excess of halogen over that theoretically required to react with the cyanide is preferred. According to theory, five moles of halogen are required for every two moles of cyanide (as sodium cyanide). In general, it is desirable to employ at least 5.0 times the amount theoretically required. More preferably, from about 7 to 15 times the theoretical amount of halogen, and most preferably at least 10 times the amount of halogen is used. In general, the higher the temperature, the more halogen required. In other words, higher temperatures render the process less efficient since more halogen is needed to obtain the same reduction of cyanide.

The reaction pressure is not critical and ambient pressure can be used. Usually pressures less than atmospheric offer no material advantage. Pressures higher than atmospheric, e.g., about 50 p.s.i.g., can be employed if it is desired to keep the halogen in solution. This expedient is preferentially employed when the halogen used is chlorine and rather elevated temperatures, e.g., 80 to 100° C., are used in the process.

The process is readily carried out and it is only necessary to efficiently contact the reactants. Accordingly, agitation of the reaction mixture is desirable. Although not critical, the use of a solvent for the cyanide contaminated salt is preferred, since it tends to insure a smooth reaction rate and efficient contacting of the reactants. The exact nature of the solvent is not critical and any inert solvent can be employed. Water is a highly preferred solvent. If desired, the water may be mixed with minor amounts of co-solvents such as lower alcohols, e.g., methanol and ethanol, or lower ketones, e.g., acetone or methyl ethyl ketone. Very good results are obtained when the solution is alkaline.

The reaction time is not critical and is dependent to some extent upon the other reaction conditions employed. Usually the process is completed in less than five hours. A one-half hour to three-hour reaction period is preferred.

Although the process of this invention can be employed to reduce the cyanide levels of any alkali metal salt of nitrilotriacetic acid, trisodium nitrilotriacetate is the preferred reactant, since it is the preferred article of commerce.

As an example, the efficiency of this process was demonstrated by preparing a solution of 33.1 grams of trisodium nitrilotriacetic acid monohydrate in 50 ml. of solution containing 4.618 grams per liter of sodium hydroxide and 0.187 gram per liter of sodium cyanide. This solution is equivalent to a 37.5 weight per solution of trisodium nitrilotriacetate monohydrate having a 2 weight percent excess of sodium hydroxide and 150 parts per million of cyanide. In other words, this solution corresponds to a typical trisodium nitrilotriacetate preparation afforded by the method of application Ser. No. 427,947, now U.S.P. 3,337,607, supra (and containing 150 parts per million of added cyanide). The solution was placed into a reaction vessel and 10 times the amount of chlorine theoretically required to react with the added sodium cyanide present, i.e., 117 ml. of chlorine, was introduced into the solution. The reaction temperature was 25° C. After the reaction was completed, analysis demonstrated that zero parts per million of cyanide were present in the reaction mixture.

When less chlorine was used, viz, 5 times the theoretical amounts of chlorine, the cyanide level was reduced to 5–10 parts per million. In another experiment, when the amount of chlorine was 1.5 times that required by theory, the cyanide level was reduced to 40–50 parts per million. Similar results are obtained with the corresponding potassium and lithium salts and with bromine and iodine.

As an example, to demonstrate the effect of temperature on the reaction, the reaction of the first example was essentially repeated, using five times the amount of chlorine theoretically required. However, in this experiment the reaction temperature was 60° C. instead of 25° C. After the reaction was completed, analysis demonstrated that the cyanide level has been reduced to 50 parts per million.

The halogenation procedure is preferably conducted in the presence of an alkali metal hydroxide. In general, at least two moles of hydroxide per each mole of cyanide to be treated is preferred. More preferably, from 2 to 15 moles of hydroxide per each mole of cyanide is used.

In every instance where halogen is used according to the procedure of this invention, the treated salt used in the process becomes lighter in color. To supplement the brightening action, a preferred embodiment of this invention comprises the use of a charcoal decolorizing step in conjunction with the halogen treating step. The charcoal treating step can be conducted either before or after the alkali metal salt is treated with halogen. In general, the amount of charcoal is from about 0.1 to about 10 parts by weight per each 100 parts by weight of the salt to be treated.

Cyanide impurity can arise in nitrilotriacetic acid salts in two ways. Firstly, some cyanide can be carried over in the ntrilotriacetonitrile product (which is later hydrolyzed to a salt of nitrilotriacetic acid) when the nitrilotriacetonitrile is prepared from formaldehyde, hydrogen cyanide, ammonia (or an ammonium salt) in the presence of a mineral acid. In addition, some cyanide is produced when nitrilotriacetonitrile is hydrolyzed to a salt of nitrilotriacetic acid. The process of this invention can be extended to the reduction of cyanide levels in nitrilotriacetonitrile. Furthermore, if desired, the process of this invention can be used twice, that is, a treatment of nitrilotriacetonitrile followed by a treatment of the salt of nitrilotriacetic acid produced by hydrolysis of the nitrile. For economic reasons, it is preferred that the process of this invention be used only after the salt has been prepared.

Although the process of this invention can be used to treat nitrilotriacetonitrile or an alkali metal salt of nitrilotriacetic acid prepared by any method it is especially useful in conjunction with the process set forth in application Ser. No. 427,947, filed Jan. 25, 1965 now U.S. Patent 3,337,607. The teachings within that application are incorporated herein by reference as if fully set forth.

After the process of this invention is carried out using a solvent as a reaction medium, the purified product can be obtained in any manner known to a skilled practitioner. For example, the purified alkali metal salt of nitrilotriacetic acid can be removed from an aqueous solution containing same by precipitating the purified salt by adding an excess of organic material, e.g., methanol or acetone. Furthermore, the purified salt can be obtained from an aqueous solution containing it by removal of the water with vacuum distillation.

To illustrate that the purification process of this invention can be used in conjunction with the invention of application Ser. No. 427,947, filed Jan. 25, 1965 now U.S. Patent 3,337,607, the following example is presented.

EXAMPLE

To a reaction vessel equipped with heating, cooling, stirring, condensing and pH indicating means add 47.25 grams of formaldehyde as a 36.1 percent formalin solution. Thereafter add 187 parts of water and 18.3 parts of concentrated sulfuric acid. Then introduce a total of 8.5 parts of ammonia over a 25 minute period while cooling the vessel and contents. During this time decrease the temperature from 22° to 18° C.

Maintain the vessel contents at 14–19° C. for 1½ hours. Then add 42.3 parts (96 percent purity) of hydrogen cyanide over a period of 30 minutes, while allowing the temperature of the vessel contents to rise to 52–54° C. After the addition of hydrogen cyanide, maintain the reaction temperature at 60–66.5° C. for 65 minutes and a white solid will precipitate. Maintain the resultant mixture at 66.5–68° C. for an hour and 25 minutes and then cool to 30° C.

Discharge the contents of the reaction vessel, collect the white solid precipitate by filtration and dry it. The solid is nitrilotriacetonitrile, melting point 125–7° C.

To a reaction flask add 121.7 parts of 50.3 percent alkali metal hydroxide solution and 121 parts of water. Then add 67 parts of nitrilotriacetonitrile over a period of 13 minutes while maintaining the vessel contents at a temperature between 79 and 80° C. Thereafter maintain the temperature between 74 and 82° C. for one hour and 15 minutes. Then decrease the temperature of the vessel contents to 55° C. Add 0.785 part of chlorine gas over a 35-minute period.

Evaporate water from the resultant reaction mass until the mass is semi-solid. To this mass add approximately 200 parts of methanol. A precipitate will form. Filter the slurry and dry the precipitate. One hundred and thirty parts of trisodium nitrilotriacetate will be obtained. Analysis will demonstrate that the product contains less than 5 parts per million of cyanide impurity.

In the above example all parts are by weight.

The above example illustrates a preferred embodiment of this invention. That embodiment is a process for the preparation of an alkali metal salt of nitrilotriacetic acid, said salt having a minimal amount of cyanide impurity, said process comprising (1) adding hydrogen cyanide to a system comprising water, formaldehyde and an ammonium salt of a strong non-oxidizing mineral acid such that the amount of hydrogen cyanide added is substantially stoichiometric as to said ammonium salt and maintaining the reaction mixture thereby produced under reaction conditions whereby nitrilotriacetonitrile is obtained; (2) hydrolyzing said nitrilotriacetonitrile with aqueous alkali metal hydroxide to obtain a trialkali metal nitrilotriacetate; and (3) treating said trialkali metal nitrilotriacetate with halogen (preferably chlorine) to reduce any cyanide impurity in said nitrilotriacetate salt to a minimal level.

Having fully described the invention and its utility and advantages, it is desired that this invention be limited only within the lawful scope of the appended claims.

I claim:

1. A process for reducing cyanide impurities in a cyanide contaminated alkali metal salt of nitrilotriacetic acid, said process comprising reacting said salt with chlorine.

2. A process of claim 1 wherein said alkali metal salt is trisodium nitrilotriacetate.

3. A process of claim 2 wherein the amount of chlorine employed is from about 5.0 to about 15 times the amount of chlorine theoretically required to react with the cyanide present in said cyanide contaminated alkali metal salt.

4. A process of claim 3 conducted at a temperature within the range of from about −5° to about 30° C.

5. A process of claim 1 wherein the reaction between said cyanide contaminated alkali metal salt of nitrilotriacetic acid and chlorine is preceded by a step comprising the treatment of said salt, in an essentially aqueous solution, with decolorizing charcoal, followed by the removal of said charcoal by filtration.

6. A process of claim 1 wherein the reaction between said cyanide contaminated alkali metal salt of nitrilotriacetic acid and chlorine is followed by a step comprising the treatment of said salt, in an essentially aqueous solution, with decolorizing charcoal, followed by the removal of said charcoal by filtration.

References Cited

UNITED STATES PATENTS

| | | | |
|---|---|---|---|
| 2,860,164 | 11/1958 | Kroll et al. | 260—534 |
| 3,337,607 | 8/1967 | Wollensak | 260—534 |

FOREIGN PATENTS

| | | |
|---|---|---|
| 564,208 | 10/1958 | Canada. |
| 718,942 | 9/1965 | Canada. |

LORRAINE A. WEINBERGER, *Primary Examiner.*

A. P. HALLIUN, *Assistant Examiner.*